June 21, 1966 E. F. WEISER 3,257,597
ELECTRICAL CONVERTER SPEED CONTROL SYSTEM
Filed Dec. 13, 1963 4 Sheets-Sheet 1

INVENTOR.
EARNEST F. WEISER
BY
Lawrence G. Norris
HIS ATTORNEY

June 21, 1966   E. F. WEISER   3,257,597
ELECTRICAL CONVERTER SPEED CONTROL SYSTEM
Filed Dec. 13, 1963   4 Sheets-Sheet 2

FIG.3

INVENTOR.
EARNEST F. WEISER
BY
Lawrence G. Norris
HIS ATTORNEY

INVENTOR.
EARNEST F. WEISER
BY Lawrence G. Norris
HIS ATTORNEY

United States Patent Office 3,257,597
Patented June 21, 1966

3,257,597
ELECTRICAL CONVERTER SPEED CONTROL SYSTEM
Earnest F. Weiser, Erie, Pa., assignor to General Electric Company, a corporation of New York
Filed Dec. 13, 1963, Ser. No. 330,319
12 Claims. (Cl. 318—344)

My invention relates to motor control systems and it has particular application to the control and regulation of motor propulsion systems for electric railway applications.

As is well known in the art there are several different types of propulsion systems which are utilized for electric railway car propulsion. One type, to give an example, utilizes a direct current power source in combination with series D.-C. motors with the control of tractive effort being accomplished through a sequencing switching controller which connects the motors in series or parallel with respect to each other and which steps resistance into or out of the motor circuits to achieve control of motor current and thus tractive effort. In such a system, control is achieved essentially through the dissipation of excess power in the control resistance connected into the motor circuits, which of course represents a power loss to the system.

Some applications have also been made of systems which utilize an A.-C. power source and which include rectifying equipment to produce D.-C. power for the propulsion system, with the propulsion system and control being of the D.-C. type discussed above. In such a system, the power dissipation inherent in the resistance switching type of control is combined with the further disadvantage of the power losses encountered in the A.-C. to D.-C. rectifying system.

Another alternative approach which has been applied in combination with the A.-C. power system involves the use of A.-C. type traction motors. Such motors are, however, considerably more bulky and less efficient than the D.-C. type traction motors and do not provide many of the advantages of the D.-C. type propulsion system.

In order to combine the advantages of an A.-C. type power distribution system with a D.-C. type propulsion system, various attempts have been made to provide a control which is capable of accepting an A.-C. power input and providing a D.-C. output, the voltage level of which can be controlled in an efficient manner to regulate the power delivered to a D.-C. propulsion system so as to avoid the need for resistance switching and thus eliminate the power losses inherent in that type of control. Such systems have, however, been subject to a number of disadvantages in terms of such factors as equipment costs, regulating ability and power factor control such that no widespread adoption of systems of this type has been made.

In view of the foregoing, it is a primary object of my invention to provide an improved system of the last mentioned type for controlling and regulating a D.-C. motor system from an A.-C. power source and which offers significant advantages over systems heretofore proposed.

Very briefly, my invention contemplates, in one embodiment thereof, the provision of a power source which is broken up into two or more separate blocks which may be stepped into or out of the system. This may be accomplished, for example, by means of an input transformer having a secondary formed of a number of secondary windings or taps each of which represents a block of supply voltage which may be stepped into or out of the system. These supply voltage blocks are connected through rectifier means to provide corresponding D.-C. voltage blocks which are available for the control of the D.-C. motors. In the embodiment presented herein, I have used three such voltage blocks although it will be understood from the description which follows that any suitable number may be employed.

Now in at least one of these blocks, but preferably only one, I provide controlled rectifier means such as, for example, ignitrons, having phase control firing, which permit the regulation of the output voltage of that block over a preselected range. The system is then sequenced in such a way that the required regulation is achieved only by modulation of the controlled block but with full regulation being provided over essentially the full input voltage range.

In achieving the foregoing, I provide various novel means for synchronizing the power switching and regulating functions to provide smooth and fully controlled regulation over the full operating voltage range while at the same time regulating only a portion of the supply voltage.

My invention and its various other objects and advantages will be better understood by reference to the following specification taken in connection with the accompanying drawings, in which, with respect to the embodiment of my invention presented herein.

Figure 1:
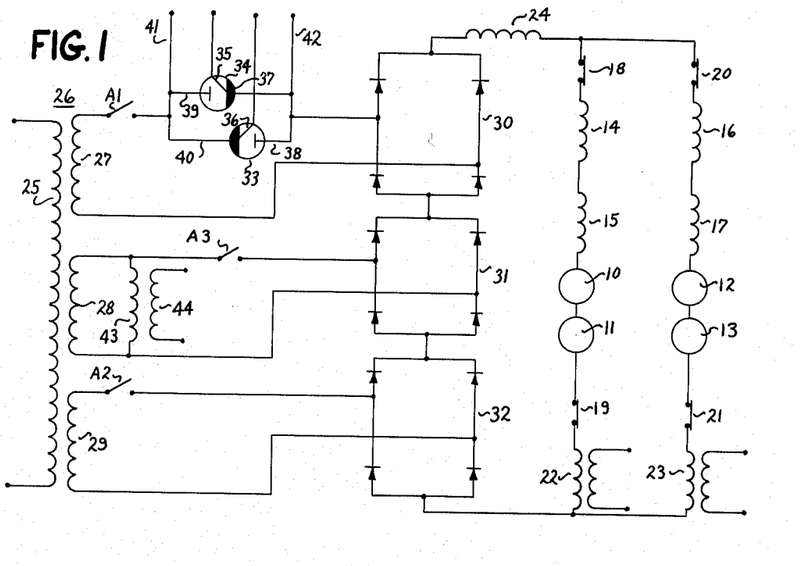
FIG. 1 is a circuit diagram showing the power input connections for a three block control and the power connections to a D.-C. motor system.

Referring now to FIG. 1, I show in this illustration the input power connections for a system comprising four D.-C. traction motors 10, 11, 12 and 13, with motors 10 and 11 being series connected along with their respective fields 14 and 15 and motors 12 and 13 being similarly series connected along with their fields 16 and 17. The two motor banks are connected in parallel with each other and each leg contains suitable power contactors 18, 19, 20 and 21 along with current measuring reactors or current transformers 22 and 23 for obtaining signals proportional to motor current. The power connection to the motor system is made through a smoothing reactor 24 to the rectifier supply as shown.

Input power to the system is supplied to the primary 25 of a power transformer 26 with the transformer secondary in the embodiment illustrated being divided into three secondary windings 27, 28 and 29 to provide three separate blocks of secondary voltage. As will later be explained, any number of two or more voltage blocks may be provided depending on the needs of the system to be regulated.

The secondary windings 27, 28 and 29 are connected through relay operated contactors A1, A2 and A3 to full wave rectifier bridges 30, 31 and 32. Each of the rectifier bridges comprises four rectifying devices connected in a conventional manner for full wave operation and the rectifier devices may be of any suitable type such as silicon rectifiers selected for handling the power requirements of the system.

The secondary winding 27 is connected to the rectifier 30 through a pair of back to back connected controlled rectifiers 33 and 34 which may be, for example, ignitrons having ignitor control leads 35 and 36 to provide for controlled firing. The ignitrons are connected in inverse parallel relationship with the cathode 37 of ignitron 34 being connected to the anode 38 of ignitron 33 and the anode 39 of ignitron 34 being connected to the cathode 40 of ignitron 33 for full wave operation into the rectifier 30.

The operation of controlled rectifiers such as, for example, ignitrons, silicon controlled rectifiers and magnetic devices such as saturable reactors which provide a similar type control is well known in the art and will not be discussed here in any detail. Suffice it to say that the devices 33 and 34 are of the type which present a relatively high blocking impedance until the point of breakdown which is controlled by a firing signal, such as by a signal applied to ignitors 35 or 36, at which point current flow is permitted through a relatively low impedance.

By controlling the firing point during each half cycle of the output of the transformer secondary 27, the average voltage delivered to the rectifier 30 may be regulated between a maximum provided by fully advanced firing and a minimum provided by fully retarded firing.

For control purposes subsequently to be discussed, means in the form of connections 41 and 42 are provided for sensing the voltage across the ignitrons 33 and 34. Also, a control transformer 43 is connected across secondary winding 28 to provide a control voltage signal at its secondary 44.

The three rectifier bridges 30, 31 and 32 are connected in series with each other through the smoothing reactor 24 to the two parallel connected motor banks such that the voltages produced by each of the secondary windings, when rectified, add to each other. When their respective windings are not energized, the rectifiers serve merely to pass the D.-C. current flowing in the system.

Before proceeding to an explanation of the associated switching and control circuitry, a brief explanation of the operation of the circuit of FIG. 1 will be set forth.

In operation, the operator's control signal selects the number of voltage blocks which are to be stepped into the system. Sequencing is initiated upon the closure of motor contacts 18, 19, 20 and 21 and upon closure of contact A1 to connect the winding 27 into the system through ignitrons 33 and 34 and rectifier 30. At this point contacts A2 and A3 remain open so that windings 28 and 29 are not connected into the system.

Firing of the ignitrons 33 and 34 is initiated at full retarded firing and is advanced in accordance with various control parameters to achieve smooth and controlled acceleration up to either the fully advanced firing point or to some intermediate point depending upon the mode of operation selected. As firing is advanced, the voltage across the motors is increased.

If an additional voltage block is called for, the attainment of fully advanced firing on the ignitrons controls the addition of the next block, in this case winding 29, through the closing of contact A2. At this point, defiring of the ignitrons 33 and 34 to a preselected retarded firing point is synchronized with the closing of contact A2 and the firing advance control begins once again to advance the firing of the ignitrons through the voltage block level of winding 27. If a further voltage block is called for, contact A3 is closed with similar synchronization of the de-firing of the ignitrons and the firing advance sequence begins again to increase the voltage supplied to the motors to its maximum level.

Throughout the foregoing sequence, motor load current, which is sensed by current measuring reactors 22 and 23 is limited, regulated and controlled in accordance with various control parameters in a manner later to be explained. Transformer secondary voltage, which is sensed at winding 28 through transformer 43 is also utilized for various control purposes as will be explained later on.

Figure 2:
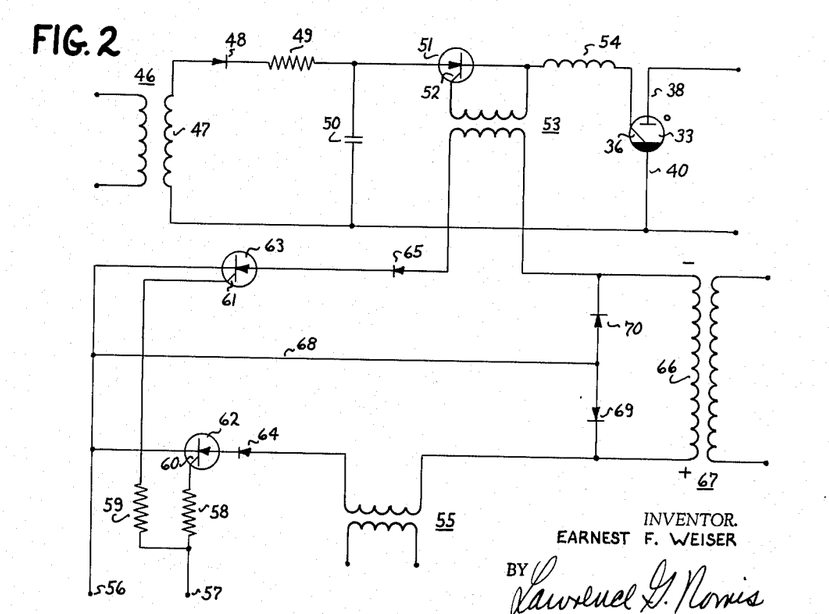
FIG. 2 is a circuit diagram showing the firing circuit for the controlled rectifiers which provide voltage modulation of the regulated voltage block of FIG. 1.

Referring now to FIG. 2, I have illustrated a firing circuit for firing the ignitrons 33. For simplifying the explanation, the circuit is presented in detail only with respect to ignitron 33, it being understood that the same circuit, or any other suitable circuit, may be utilized for firing the other ignitron 34.

Firing voltage is supplied through a transformer 46 which is connected to the supply in any suitable manner, such as through the transformer 43 of FIG. 1. The secondary 47 of transformer 46 is connected through a diode 48 and a resistor 49 to charge a capacitor 50, which is in turn connected as shown to the cathode 40 of ignitron 33 and to a controlled rectifier 51, which may be of any suitable type such as a silicon controlled rectifier.

The gate 52 of the controlled rectifier 51 is connected to be energized by a firing pulse applied through a transformer 53 as shown. The controlled rectifier 51 is connected to the ignitor 36 of ignitron 33 so that upon the application of a firing pulse through transformer 53, the controlled rectifier 51 fires to permit capacitor 50 to discharge through the ignitor 36 and fire the ignitron 33. The ignitron firing signal is formed into a pulse through a series connected reactance 54. Ignitron 34 is fired in a similar manner through transformer 55 which is connected to the gate of a controlled rectifier in a similar firing circuit connected to ignitron 34.

The control firing pulse is supplied to the circuit at terminals 56 and 57 and is connected through resistors 58 and 59 to the gates 60 and 61 of controlled rectifiers 62 and 63 respectively. The controlled rectifiers 62 and 63 are connected through diodes 64 and 65 and through the transformers 53 and 55 to the secondary 66 of a transformer 67 which is connected to the A.-C. source, such as to transformer 43 of FIG. 1, to provide firing pulse power and to synchronize selection of the firing of ignitrons 33 and 34 with alternate half waves of the supply. A return path is provided through connector 68 and diodes 69 and 70.

It will be noted that each firing pulse appearing at terminals 56 and 57 energizes the gates 60 and 61 of both of the controlled rectifiers 62 and 63. However, the polarity of the voltage at the secondary 66 of transformer 67 will determine which ignitron is to fire for that half cycle because current is blocked by either of the two diodes 64 or 65 through its respective pulse transformer 55 or 53 on alternate half cycles.

Assume, for example, a polarity across the secondary 66 as shown. Upon the firing of controlled rectifiers 62 and 63, current will flow through transformer 55, diode 64, controlled rectifier 62, lead 68 and diode 70 back to the other side of the winding 66. Current flow through pulse transformer 53 is blocked by diode 65 for the example given and, in addition, the reverse voltage across diode 65 and controlled rectifier 63 is limited to the forward voltage drop of diode 70. During the next half cycle, when the polarity of the winding 66 is the opposite of that illustrated, firing of the controlled rectifiers 62 and 63 produces current flow through transformer 53, diode 65, controlled rectifier 63, lead 68 and diode 69, with current flow through transformer 55 being blocked by diode 64, with reverse voltage again being limited by the forward drop of diode 69.

Thus, the application of the firing pulses to both of the controlled rectifiers 62 and 63 produces the proper ignitron firing sequence as determined by the phase of the supply voltage.

Figure 3:
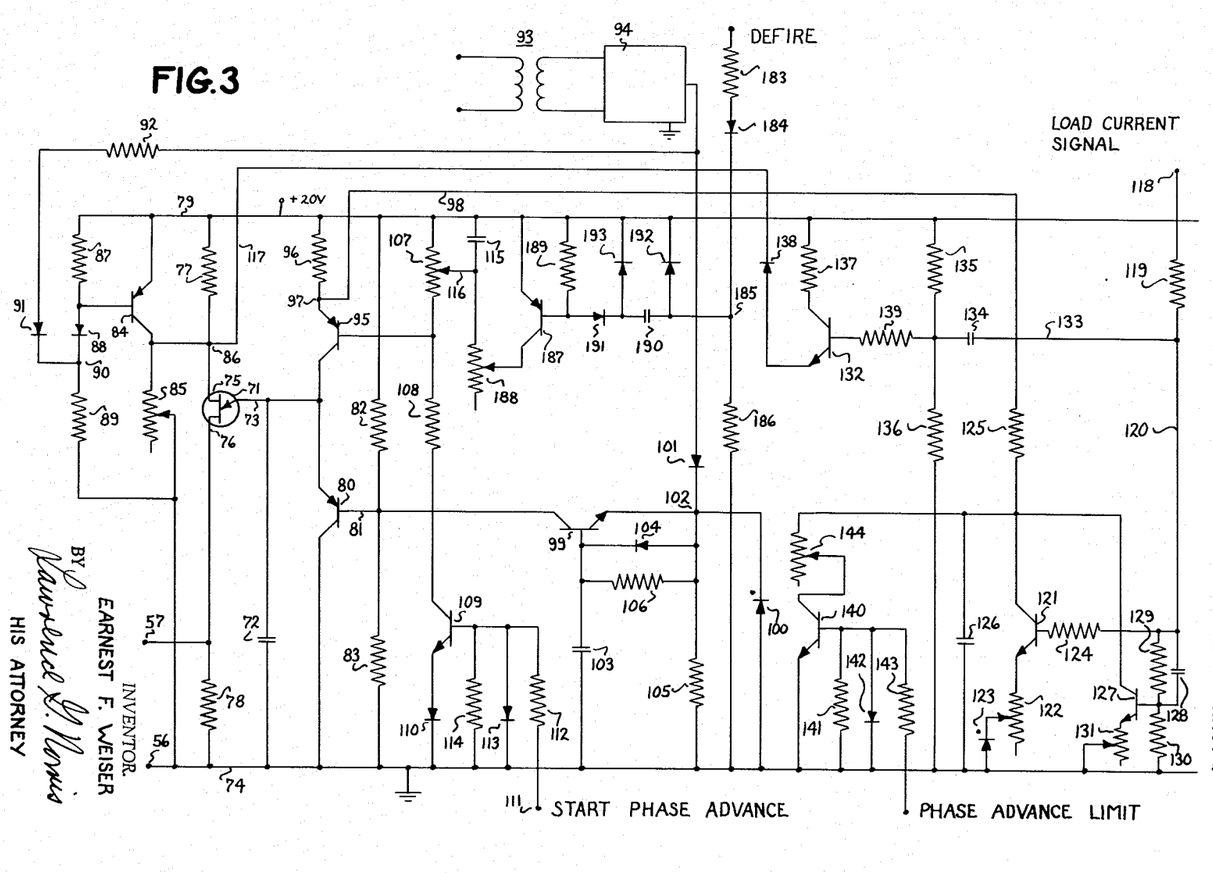
FIG. 3 shows the firing control circuitry which provides the firing control signals to the circuit of FIG. 2.

Referring now to FIG. 3, I have illustrated here the firing control circuit which generates the firing pulses applied at the terminals 56 and 57 of the firing circuit of FIG. 2. The basic control elements of the circuit of FIG. 3 which provide for the generation of firing pulses are a unijunction transistor 71 and a capacitor 72. The capacitor 72 is connected between the emitter 73 of the unijunction transistor and ground lead 74 while the bases 75 and 76 of the unijunction transistor are connected as shown through resistors 77 and 78 respectively to a regulated D.-C. supply voltage at 79 and to ground lead 74. The line 79 is regulated at a fixed D.-C. voltage level, say 20 volts, by any suitable means such as by a breakdown diode, not shown.

Firing is controlled by regulating the point at which the capacitor 72 reaches the firing voltage of the unijunction transistor 71, at which point the capacitor 72 discharges through emitter 73, base 76 and resistor 78 to generate a voltage pulse across resistor 78 at the terminals 56 and 57. Firing control of the unijunction transistor 71 is achieved both by controlling the current flow through and hence the charge rate of capacitor 72 and by controlling the base to base voltage between the bases 75 and 76 of the unijunction transistor 71.

The maximum voltage which can be developed across the capacitor 72 is limited, preferably at a level of the normal firing voltage range, by means of a transistor 80, the base 81 of which is connected by means of resistors 82 and 83 between the D.-C. supply 79 and ground 74 to establish a bias at a level to allow transistor 80 to turn on at the preselected voltage limit of capacitor 72. This permits the selection of a base to base voltage level for the unijunction transistor 71 above which it will not fire for the maximum attainable voltage across the capacitor 72.

For a typical design the maximum voltage limit across capacitor 72 (and hence on the emitter of unijunction transistor 71) might be selected at, for example, plus 8 volts with the lockout voltage then being achievable by connecting the full 20 volt supply across the bases 75 and 76. In such a manner, lockout of the unijunction transistor 71 against firing is achieved by connecting the base 75 to the plus 20 volt supply and firing release is achieved by reducing the voltage at base 75 into the firing range.

In the circuit illustrated lockout and release control of the base 75 is accomplished by means of a transistor 84, the emitter of which is connected to supply voltage and the collector of which is connected through an adjustable resistor 85 to ground. The collector of transistor 84 is also connected at junction 86 to the base 75 of the unijunction transistor in such a manner as to short out the resistor 77 when the transistor 84 is "on."

Thus, when the transistor 84 is "on," the base 75 of unijunction transistor 71 is connected through transistor 84 to the 20 volt supply and with the voltage at collector 73 being limited by transistor 80, the unijunction transistor 71 is locked out and prevented from firing. When the transistor 84 is turned "off," however, the base 75 of unijunction transistor 71 is connected to the D.-C. supply line 79 through resistor 77 which with resistor 85 forms a voltage divider to establish a voltage at the base 75 which is within the firing range of the unijunction transistor 71 over the operating range of voltage at emitter 73. Thus, by turning the transistor 84 "off" or "on," the unijunction transistor 71 is either released for firing or blocked from firing.

Transistor 84 is biased "on" by means of a base to emitter resistor 87 which is connected through diode 88 and resistor 89 to ground lead 74 as shown. The transistor 84 may be turned "off" by back biasing diode 88 and this is done by introducing a signal voltage at the junction 90 through a diode 91 which is series connected with a suitable dropping resistor 92.

The signal voltage for controlling transistor 84 is generated from the A.-C. supply voltage introduced through a transformer 93 and a full wave rectifier 94. The transformer 93 is connected to the supply voltage in any suitable manner, such as through transformer 43 shown in FIG. 1, such that the full wave rectified output of rectifier 94 is in phase with the voltage appearing across the ignitrons 33 and 34.

The output of the rectifier 94 is connected through resistance 92 and diode 91 to junction 90 to control the blocking and unblocking of unijunction transistor 71 as described above. The purpose of the blocking action against firing of unijunction transistor 71 is to hold off the generation of a firing pulse until the voltage across the ignitrons 33 and 34 has built up to the level where conduction can be sustained if fired. This eliminates the need for holding anodes to sustain conduction.

Thus, when the rectified input voltage wave applied at junction 90 builds up to the level to back bias diode 88, the bias across resistor 87 is removed and transistor 84 is turned "off," thereby connecting base 75 of unijunction transistor 71 across the voltage divider formed by resistors 77 and 85 and reducing the voltage of base 75 into the firing range. Resistor 85 may be adjustable to provide for varying characteristics of individual unijunction transistors. The voltage level at which diode 88 become back biased in relationship to the input voltage wave is selected so as to release the unijunction transistor 71 for firing when the voltage across the ignitrons has reached a level sufficient to sustain conduction.

Charging current flowing into the capacitor 72 is controlled by a transistor 95 which is connected in the form of an emitter follower with an emitter resistor 96 being connected to the D.-C. supply line 79. The emitter follower action of transistor 95 is such as to maintain over the operating range an essentially constant current in the emitter resistor 96. Control of the current flow to capacitor 72 may therefore be accomplished by bleeding off a portion of the current flow at the junction 97 through lead 98. As more current is bled off through lead 98, a smaller current flows through capacitor 72 and the time to reach firing voltage is retarded. As less current is bled off through lead 98, a greater amount of current flows into capacitor 72 and the time to reach firing voltage is advanced. The manner in which current bleed through lead 98 is controlled to retard or advance the firing pulse will be explained later.

The generation of the firing pulses through unijunction transistor 71 by capacitor 72 is synchronized with the applied A.-C. voltage on the ignitrons 33 and 34 by means by circuitry including a transistor 99 and a breakdown diode 100. The applied A.-C. voltage waveform as rectified through rectifier 94 is applied through a diode 101 to the connection 102 between the breakdown diode 100 and the emitter of transistor 99.

Figure 4:
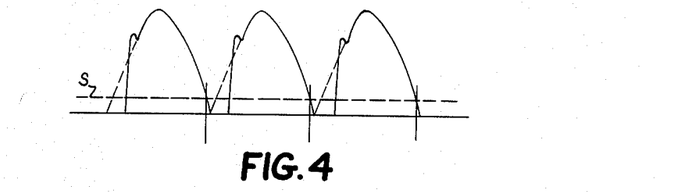
FIG. 4 illustrates a typical waveform of the transformer secondary voltage after rectification which is used for synchronizing the firing pulse generation system with the input voltage wave.

The shape of the A.-C. waveform available from the secondaries of transformer 26 (FIG. 1) is of the shape shown in FIG. 4. The delayed build up of voltage at the beginning of each half cycle is inherent in a system of the type being described in which power is supplied through a rectifier to an inductive load.

The significance of the waveform shown in FIG. 4 is that if synchronization of firing pulse generation were to be keyed to the build up of voltage at the initiation of each half cycle of voltage, a time delay would be introduced because of the lag in voltage build up which occurs at the beginning of each half cycle. The initiation of charging current flow through capacitor 72 would be similarly delayed and impractical increases in charging current levels would thus be required in order to utilize the full advanced firing point. If, on the other hand, the charging current to capacitor 72 is held to a practical level, the resulting abandonment of the available voltage ahead of the maximum achievable firing point attainable with the time delay discussed above would result in poor utilization of the power system components.

The synchronization arrangement which I have evolved avoids this difficulty by permitting synchronization with the trailing edge portion of each half cycle of the waveform shown in FIG. 4. As mentioned above the rectified A.-C. voltage waveform having the general shape shown in FIG. 4 is applied through diode 101 to the junction 102. As long as this voltage is above the spill level of the breakdown diode 100, the voltage at junction 102 is held at the spill level, which holds transistor 99 "off" and charges capacitor 103 through diode 104. As long as transistor 99 remains "off," transistor 80 operates merely to establish an upper voltage limit on capacitor 72 as previously explained.

Now as the trailing edge of the A.-C. voltage wave falls below the spill level of breakdown diode 100, say at the level indicated by the line S in FIG. 4 and representing the level at which the initiation of synchronization action is desired, the voltage on capacitor 103 then exceeds the voltage at junction 102 and the capacitor 103 then begins to discharge through the base to emitter of transistor 99 and resistor 105, thereby turning transistor 99 "on."

As transistor 99 is turned "on," base current is drawn from transistor 80 upsetting the control of resistors 82 and 83 and turning transistor 80 "on." The turning "on" of transistor 80 discharges capacitor 72 to ground with the descending A.-C. voltage wave, thus clearing capacitor 72 for the next half cycle build up.

The discharge time constant of capacitor 103 through resistor 105 is chosen such that the discharge rate tracks the descending voltage wave down toward the zero level. As the zero level is approached, bleed current flowing through the collector to base of transistor 99 and through resistor 106 shuts off transistor 99 re-establishing the control of resistors 82 and 83 on transistor 80 and turning off transistor 80.

The circuit is thus synchronized with the descending trailing edge of each half wave of applied voltage with capacitor 72 being discharged and readied for recharging in advance of the voltage build up for the next half wave. The charging current level to capacitor 72 required to achieve fully advanced firing is thus held to practical levels.

Scheduled advance of the firing point in accordance with a preselected firing advance rate is obtained by controlling the rate of decrease of a reference voltage at the base of transistor 95. As the base reference voltage of transistor 95 is increased, the maximum charging current to capacitor 72 is reduced and as the base voltage on transistor 95 is decreased, the maximum charging current to capacitor 72 is increased. With the base of transistor 95 at the full 20 volt D.-C. level, no charging current can flow and firing cannot occur. Thus, firing advance can be controlled as a function of time by scheduling the rate of voltage decreased at the base of transistor 95 as a function of time.

The base of transistor 95 is connected to a voltage divider formed of variable resistor 107 and resistor 108, which in turn is connected to ground through transistor 109 and diode 110. When transistor 109 is "off" the base of transistor 95 is held at the full 20 volt level and no charging current can flow to capacitor 72.

Transistor 109 is turned "on" by means of a phase advance signal introduced at terminal 111 and through a current limiting resistor 112. In the embodiment presented, phase advance is initiated by the appearance of voltage across the ignitrons 33 and 34 of greater than a preselected minimum level. This voltage is rectified, filtered, and applied at terminal 111. The circuitry for generating the phase advance signal will be described in detail later on in connection with the description of FIG. 7.

The appearance of a voltage across ignitrons 33 and 34 in the normal operating range thus turns "on" transistor 109 through application through resistor 112 and diode 113. Transistor 109 is otherwise normally held "off" through conventional means such as diode 110 and resistor 114 connected as shown.

When transistor 109 is turned on by the appearance of voltage across the ignitrons 33 and 34, the time rate of change of the base voltage of transistor 95 is determined by the charging rate of a capacitor 115 which is connected to the adjustable tap 116 of resistor 107. At the instant transistor 109 is turned "on," the base voltage of transistor 95 is determined by the voltage divider formed by the unshunted portion of resistor 107 and the resistor 108 plus the starting voltage across capacitor 115, which is set by means subsequently to be described.

At this instant the maximum phase advance is limited by the voltage at the base of transistor 95 which limits the maximum charging current which can flow to capacitor 72. At this point, the firing is held at a retarded level by the time to charge capacitor 72 to the firing voltage level at the emitter 73 of unijunction transistor 71 such that with the charging current limited as explained above, firing is retarded too late in each half cycle. The power applied to the motors 10, 11, 12 and 13 is thus limited at some initial or starting level.

As capacitor 115 charges and its voltage builds up as a preselected function of time, the voltage at the base of transistor 95 is decreased and the maximum charging current which can flow to capacitor 72 is correspondingly increased, thus advancing the firing point as a function of time because, with a higher charging current, the capacitor 72 takes less time to charge during each half cycle to the firing voltage of unijunction transistor 71, and firing thus occurs earlier in the half cycle.

It should be noted here that the charging current scheduled by the base control voltage at transistor 95 is only a maximum and that the actual charging current which flows to capacitor 72 can be reduced below this level by bleeding off a portion of this current through lead 98 to retard firing behind the maximum advance point permitted by the voltage base control at transistor 95. As explained above, firing can also be retarded by increasing the voltage level at base 75 of unijunction transistor 71. This can be accomplished by introducing a current through lead 117 at junction 86 to increase the voltage drop across resistor 85.

At this point, therefore, a number of parameters which control the firing point of unijunction transistor 71 have been discussed. As discussed above, the maximum firing advance rate is determined by the charging rate of capacitor 115 which determines the rate of decrease of voltage at the base of transistor 95 and hence the maximum charging current which can flow at any instant of time to capacitor 72. Phase advance can be retarded behind this point by bleed off of current through lead 98 to reduce charging current flow to capacitor 72. Phase advance control is also achieved by control of the voltage at base 75 of the unijunction transistor through control lead 117. The manner in which the firing control signals applied through leads 98 and 117 are generated will be explained later on.

To summarize briefly at this point, phase advance is initiated by the application of a phase advance signal, in this case the voltage across the ignitrons, at terminal 111. Phase advance from full retard to full advance then proceeds automatically as a funtcion of time determined by the charging rate of capacitor 115 subject to the retard signals applied through leads 98 and 117. At fully advanced firing, the maximum available voltage of winding 27 (FIG. 1) is applied to rectifier 30 in the motor supply circuit.

As mentioned above, motor current is measured by current measuring reactors 22 and 23 as illustrated in FIG. 1. The outputs of these current measuring reactors are balanced against each other in any suitable manner, such as across a pair of rectifier bridges, such that the higher of the two currents is the effective controlling signal. The resulting load current signal is applied at terminal 118 of the circuit of FIG. 3.

The load current signal appearing at terminal 118 is then applied through resistor 119 and lead 120 to a current limiting and lead circuit which will now be described. Load current limiting is achieved by the action of a transistor 121, the emitter of which is connected to ground through an adjustable resistor 122 and a breakdown diode 123. The load current signal is connected to the base of transistor 121 through a resistor 124. The collector of transistor 121 is connected to control lead 98 through resistor 125 and transistor 121 is thus in a position to control current bleed from junction 97 and retard the firing of unijunction transistor 71.

When the load current signal at the base of transistor exceeds a preselected level determined by the breakdown voltage of breakdown diode 123, the diode 123 breaks down and permits collector to emitter current to flow through transistor 121. When this occurs current bleed is established from junction 97 through resistor 125, transistor 121, resistor 122 and diode 123 to retard the firing of unijunction transistor 71 and thus reduce the voltage applied to the motors. The gain of transistor 121 is set to the desired level by adjustment of resistor 122. Thus, the maximum load current to the motors is limited by the bleed action of transistor 121 as determined by the breakdown voltage of diode 123.

The response of transistor 121 is modified by the filtering action of capacitor 126, which is connected as shown from the emitter of transistor 121 to ground. The action of capacitor 126 in attenuating response at higher frequencies, such as, for example, in the range of the ripple frequency of the load current, will be explained in further detail later on.

At this point, some discussion of the problems of stabilizing a system of the type presented herein would appear to be helpful. Because of the phase shift produced by the many lags in a system of this type, some compensating phase lead is usually required in order to achieve stable closed loop operation. This can be accomplished by introducing what is commonly known as "lead" or rate response. In such a system, the control responds to the rate of change of the controlled parameter to prevent unstable oscillation or hunting of the system.

In addition to the stability requirements, rate control is also desirable in a system of this type to avoid undesirably high rates of change which would, for example, in an electric railway propulsion application cause high acceleration rates or "jerking" with attendant passenger discomfort.

Unfortunately, within the practical size limits of the smoothing reactor 24 (FIG. 1) the motor load current still contains a relatively high ripple content such that if a conventional rate response system were employed which were sufficiently sensitive at the higher rates or frequencies to achieve loop stabilization, it would also respond at the load current ripple frequency.

Such a system, if applied in a conventional manner, would attempt to adjust ignitron firing each half cycle and would throw ignitron firing into unbalance because of the unbalanced shape of the ripple wave, with one ignitron tending to advance to full advanced firing and the other being pushed back toward fully retarded firing. On the other hand, if the response of the rate system at the ripple frequency rate is sufficiently attenuated to avoid the foregoing problem, then the system is not sufficiently responsive at the higher average rates of change of load current to effect proper loop stabilization.

To avoid the above described difficulty, I employ two separate rate responsive systems. One of these is responsive at rates extending into the ripple frequency range but is introduced into the system in such a manner that its response to the load current high ripple frequency rate is incapable of producing an unbalanced firing condition of the ignitrons. The second rate response system provides control of the slower rates of change to assure limitation of acceleration and deceleration as required for passenger comfort.

Figure 5:
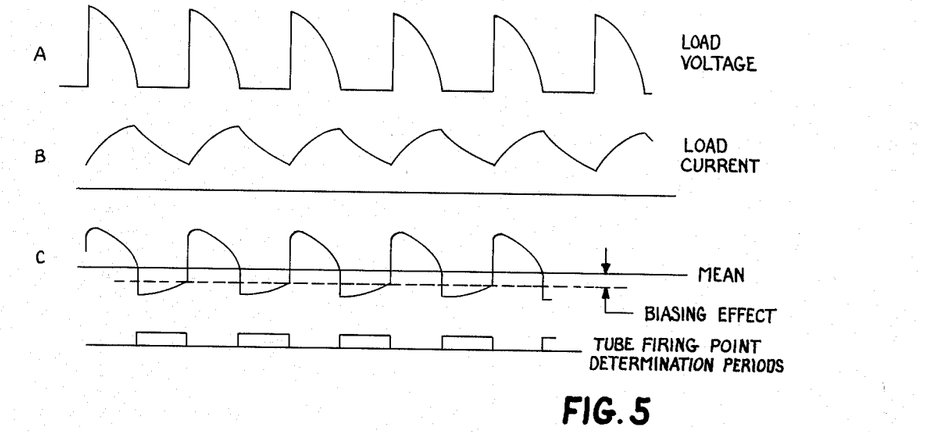
FIGS. 5 and 6 are presentations of various waveshapes which occur in the system and which will be referred to in connection with the explanation of the operation of the system.
Figure 6:
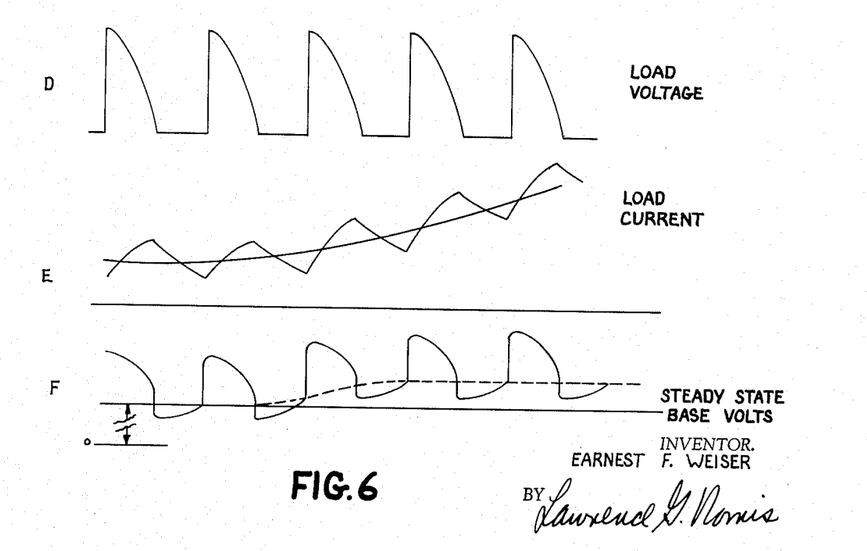

Before explaining the foregoing further, I will first present the operation of the two rate control systems incorporated in FIG. 3, after which I will discuss the above problem in further detail with reference to the waveforms presented in FIGS. 5 and 6.

Referring again to FIG. 3, the slow rate control is accomplished through the introduction of the load current signal at lead 120 into transistor 127 through a lead network formed of capacitor 128 and resistors 129 and 130 connected as shown. The emitter of transistor 127 is connected to ground through an adjustable resistor 131 to permit gain adjustment.

By reason of the lead network just mentioned, transistor 127 thus responds to the rate of change of the load current signal as applied through line 120. The output of transistor 127 is, however, "lagged" or attenuated at the load current ripple frequency range by the filtering action of capacitor 126. The action of transistor 127, therefore, is to apply a slow rate response correction by bleeding current from the junction 97 through resistor 125, with the response at the higher rates in the ripple frequency range being attenuated by capacitor 126. It should be noted here that the rate control action of transistor 127 is fully effective only at load current levels below the level limited by the breakdown voltage of diode 123 because above this level diode 123 breaks down and transistor 121 exercises the primary control on bleed current to retard firing.

Fast rate control necessary for system stabilization is achieved by introducing the load current signal to transistor 132 through lead 133 and a series connected capacitor 134. Steady state voltage at the base of transistor 132 is established by means of a voltage divider formed of resistors 135 and 136 connected as shown between supply and ground. The collector is connected to the supply voltage through resistor 137. The emitter of transistor 132 is connected through a diode 138 and lead 117 to junction 86.

The input lead or differentiating network to transistor 132 is formed by resistor 119 and capacitor 134 connected in series with the parallel resistance of resistors 135 and 136. The input to the transistor is connected through a base resistor 139.

At steady state, transistor 132 is biased "on" and its steady state emitter current sets the voltage at junction 86, and hence the base 75 of unijunction transistor 71, at a preselected operating level for zero load current rate input through capacitor 134. Maximum and minimum operating voltages at the base 75 (exclusive of the lockout action of transistor 84) are determined respectively by the full "on" or saturated condition and the full "off" condition of transistor 132 with modulation between these levels being secured by the load current rate input through capacitor 134. For high rates of change of load current in the direction of increase such as to saturate transistor 132, its emitter current through lead 117 is at a maximum and the voltage at the base 75 of unijunction transistor 71 is accordingly driven to its maximum operating level and the firing of unijunction transistor 71 is accordingly retarded by the maximum increment available through the selected range of modulation of the voltage at base 75. For high rates of change in the direction of decreasing load current such as to drive transistor 132 to its "off" condition, the minimum voltage at base 75, as established by resistors 77 and 85, is achieved and the firing of unijunction transistor 71 is advanced to the maximum advance point of the range of base voltage modulation provided.

Modulation between these limits is achieved through the action of transistor 132 in response to the rate of change of load current as introduced through capacitor 134. Rates of change of load current in the increasing direction increase the emitter current through lead 117 and produce an upward adjustment in the voltage of unijunction transistor base 75 to retard firing. Conversely, rates of change in the direction of load current decrease produce a decrease in the current through lead 117 to reduce the voltage at base 75 and advance the firing point.

It should be understood that the control of the firing point of unijunction transistor 71 through adjustment of the base voltage at 75 is independent of the control achieved through adjustment of the charging current flowing to capacitor 72. Thus, adjustment of the firing point through control of charging current to capacitor 72 is achieved by the load current limiting action of transistor 121 and breakdown diode 123 and by the slow rate response of the lead network of transistor 127 as attenuated by the filtering action of capacitor 126, while fast rate response is achieved through control of the base voltage at base 75 through the differentiating network of transistor 132 as just described.

The frequency response of the differentiating network of transistor 132 extends out to the range required for proper loop stabilization which, in the case of a 25 cycle A.-C. supply (50 cycle ripple frequency) extends into the ripple frequency range of the motor load current. The response of the lead network of transistor 127 is, on the other hand, heavily attenuated at this frequency by the action of capacitor 126 to avoid the ignitron firing unbalance problem discussed above.

To explain the ignitron unbalance problem further, if the current ripple caused by one ignitron is phase delayed sufficiently in the regulating loop (90° to 210° range) to be the control for the firing of the other ignitron, the resulting overcurrent from one ignitron firing too far advanced can be the signal causing the other ignitron to be fired too far in retard with its resulting undercurrent resulting in a further advance of the first ignitron. This can be cumulative, driving one tube to full advance and the other to full retard. Sufficient load current filtering at the ripple frequency range to prevent this mode of operation introduces regulating loop phase delay which is too large for proper main loop stabilization. Similarly, added phase delay by such filtering can cause further ripple phase delay, defeating the desired effect of added ripple attenuation on tube unbalance.

To avoid the foregoing problem and still achieve proper main loop stabilization, I provide the two separate rate control effects discussed above. The slow rate response is filtered as discussed above at the ripple frequency of the load current and is thus responsive to the slower average rates of change in load current. The high rate response is responsive with substantially a full 90° phase lead at the load current ripple frequency.

In order to achieve stabilization, the gain of the high rate response system must be relatively high and, because of the system saturation limits represented by the fully retarded and fully advanced tube firing points, can cause unstable oscillations of the non-linear type. Accordingly, the range of the high rate response control of transistor 132 is limited or "clipped" by the maximum base voltage adjustment range of unijunction transistor base 75 as represented by the full "off" and saturated conditions of transistor 132. Thus, in effect, the gain of the high rate response control is high for small excursions within the modulation range of transistor 132 but is reduced at the larger excursions which drive transistor 132 into the fully "off" or saturated conditions. This achieves system stabilization while avoiding the non-linear type of oscillation discussed above.

The response of the high rate system is depicted in FIGS. 5 and 6. FIG. 5 shows a steady state operating condition with the ignitrons firing at approximately the midpoint of each half cycle. Curve A shows the waveform of the applied load voltage, curve B the load current, and curve C the signal generated by the high rate response circuit of transistor 132. The tube phase determination periods are indicated below curve C.

Since firing is synchronized from a reference standpoint with the points where the applied voltage drops to zero (in other words the trailing edges of the waves of curve A), the time during which the firing angle of the next tube to be fired is determined occurs during the time both tubes are off and when the current smoothing reactor 24 is determining the load current and rate of decline of load current. This decline rate is determined by the load inductance to load resistance ratio, which is substantially constant, and by the load current level.

The response of the fast rate control to the respective ascending and descending portions of the load current ripple is shown with reference to the mean in curve C. It will be noted that at each of the firing points, the voltage at the base 75 of unijunction transistor 71 is slightly below the mean and the result is therefore a fixed bias on the mean and can be compensated for in the choice of the bias at the base of transistor 132.

The response of the fast rate control to a rate of change in the average load current is shown in FIG. 6. Here, curves D, E and F represent respectively the load voltage, load current and the response of the fast rate system in terms of the voltage applied at base 75 of unijunction transistor 71 with reference to the steady state level compensated as described above.

As the average load current increases as shown in curve E, the firing point voltage of base 75 of unijunction transistor 71 also increases as shown by the dotted line of curve F. The increased voltage at base 75 is in a direction to retard firing and effect a rate control of the average rate of change of load current. The effect is just the opposite for a decreasing average load current.

One further mode of control is provided by the circuitry of FIG. 3. This is a phase advance limit control afforded by transistor 140. Transistor 140 is held normally "off" by resistor 141 and may be turned "on" by a signal applied forward on diode 142 through a resistor 143.

With transistor 140 "on," a fixed amount of current bleed from junction 97 through resistor 125 and adjustable resistor 144 is established, thus limiting the maximum amount of charging current which can flow to capacitor 72 and limiting the maximum phase advance to some preselected portion of the total available. This mode of control is used for slow speed applications such as yard use and the like where a lower limit on the power to be applied is desired.

Figure 7:
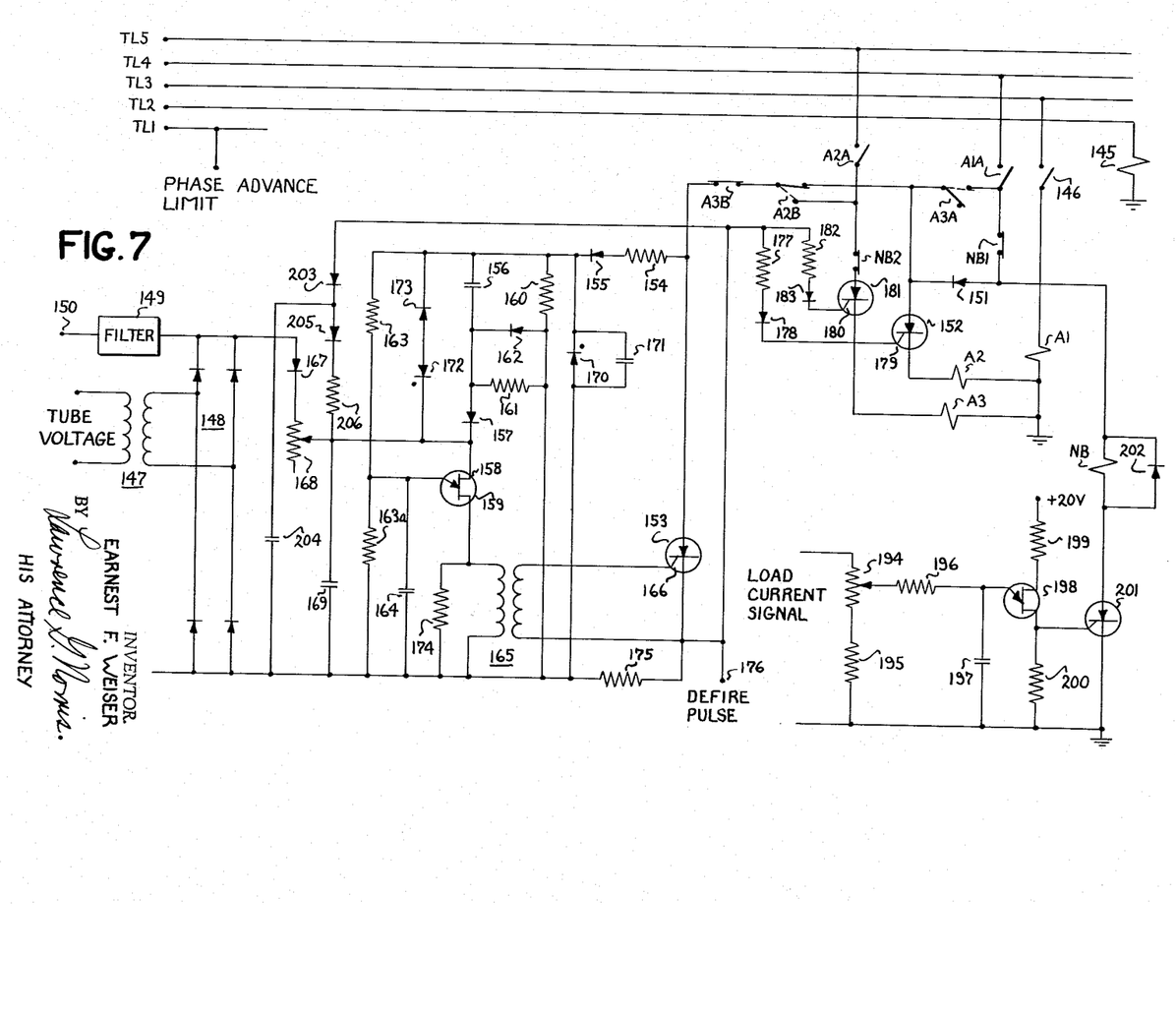
FIG. 7 is a diagram of circuitry for sequencing and synchronizing the switching of the voltage blocks with the regulation of the voltage modulated block.

Referring now to FIG. 7, I have illustrated the circuitry for determining the switching of the secondary coils 27, 28 and 29 (FIG. 1) in conjunction with the operation of the other functions heretofore described. Control of the various functions is actuated through train lines TL1, TL2, TL3, TL4 and TL5, which are connectible to a source of control power.

In order to actuate the various control modes, different combinations of train lines are energized. For convenience, these combinations will be referred to in terms of notch positions which represent the different positions of the operator's controller. The combinations to be discussed are as follows:

| Notch position: | Train lines energized |
| --- | --- |
| 1 | TL1, TL2, TL3. |
| 2 | TL2, TL3. |
| 3 | TL2, TL3, TL4. |
| 4 | TL2, TL3, TL4, TL5. |

For each control notch position listed, the combination of train lines listed is energized with no power being applied to the other train lines.

Train line TL1 is connected to the phase advance limit circuit of FIG. 3 to energize transistor 140 and limit the maximum phase advance as explained above.

The operation of the circuit of FIG. 7 will now be explained with reference to the various control notch positions with the train lines being energized as listed above.

With the controller in notch position 1, TL1 is energized to limit the maximum phase advance as indicated above. The operation of the system through the other control parameters discussed is thus subject to the superimposed phase advance limit which result in a voltage limited operation. Notch position 1 also energizes TL2 and TL3.

Train line TL2 energizes relay coil 145 which closes its associated contact 146 to commence operation of the system. Closure of contact 146 energizes coil A1 through TL3 to close associated contactors A1 and A1A. Closure of contactor A1 connects transformer secondary winding 27 into the power circuit (see FIG. 1). Closure of contactor A1A in this case produces no effect since TL4 is not energized.

The appearance of voltage across the ignitrons 33 and 34 is sensed by a transformer 147 which is connected to lines 41 and 42 of the circuit of FIG. 1. Transformer 147 is connected to a bridge rectifier 148, the output of which is connected through a filter 149 the output 150 of which is connected to terminal 111 of the circuit of FIG. 3. The appearance of voltage across the ignitrons thus produces a signal at terminal 150 which is applied to terminal 111 of the FIG. 3 circuit to turn transistor 109 "on" to initiate the scheduled maximum phase advance rate of the ignitrons as previously described.

Thus, under the conditions just set forth, the phase advance of the ignitrons is initiated at the retarded firing position and voltage is applied to the motor circuits through rectifier bridge 30 as shown in FIG. 1. At this point, contactors A2 and A3 remain open and secondary windings 28 and 29 remain isolated from the motor power circuit.

Scheduled phase advance of ignitron firing now begins to increase the voltage applied to the motors in accordance with a preselected time rate of increase as scheduled by the charging rate of capacitor 115 of the circuit of FIG. 3 as previously explained. This is, of course, subject to the overriding control of the motor current limiting and rate control functions described in connection with FIG. 3.

When the firing point of the ignitrons 33 and 34 reaches the point of firing advance permitted by the phase advance limit imposed by the action of transistor 140 (FIG. 3), further advance in firing is prevented and the maximum voltage available in controller notch 1 has at this point been applied to the motors. This is the termination of the control sequence for the notch 1 controller position.

Assume now that the controller is moved to the notch 2 position. This energizes TL2 and TL3 with all other train lines being deenergized. Since in this notch position, TL1 is not energized, no phase advance limit is imposed because transistor 140 (FIG. 3) is not energized and therefore remains "off."

Energization of TL2 otherwise results in the same sequence described above with winding 27 being connected into the motor power circuit through closure of contactor A1 (FIG. 1) and with the appearance of ignitron tube voltage energizing terminal 111 (FIG. 3) to turn transistor 109 "on" and initiate the phase advance action toward the fully advanced firing condition subject to the load current limit and rate control functions discussed above.

This sequence is terminated when the ignitrons advance to the fully advanced firing condition with the maximum voltage available from winding 27 being at that point applied to the motor circuit.

Assume now that the controller is moved to notch 3 to energize TL2, TL3 and TL4. Because of energization of TL2 and TL3, the control initially follows the same sequence as described above for the controller in the notch 2 position with the ignitrons advancing subject to the schedule and controls described to the fully advanced firing point. At this point, however, arrival at the fully advanced firing point actuates the control for switching in the next voltage block, winding 29, and for defiring the ignitrons back to a preselected retarded position.

When contactor A1A closes at the beginning of the sequence, control power is connected from TL4 through normally closed contactor NB1 (the function of which will be explained later) and diode 151 to the anode of a controlled rectifier 152. With contactors A2B and A3B in the position illustrated, control power is also connected through these contactors to the anode of a controlled rectifier 153 and through a resistor 154 and a diode 155 to a capacitor 156, which in turn is connected through a diode 157 to the base 158 of a unijunction transistor 159.

Shunting capacitor 156 is a network comprised of a resistor 160 connected in series with the parallel combination of a resistor 161 and a diode 162.

At the same time, control power is connected across a voltage divider formed of resistors 163 and 163a which, through a relatively short time constant associated with a capacitor 164, quickly establishes a fixed emitter voltage on the unijunction transistor 159.

Since the initial voltage drop across capacitor 156 is zero, the full control voltage which is, say plus 20 volts, appears at the base 158 of unijunction transistor 159. This is sufficiently high to hold off the firing of unijunction transistor 159. As the capacitor 156 charges through the base to base resistance of unijunction transistor 159, the voltage at unijunction transistor base 158 diminishes toward zero on the time constant determined by the capacitance of capacitor 156 and the base to base resistance of the unijunction transistor 159. If nothing else happened, the voltage at unijunction transistor base 158 would eventually diminish into the firing range with the unijunction transistor 159 firing to permit capacitor 164 to discharge through a firing transformer 165 connected to the gate 166 of controlled rectifier 153.

Before this happens, however, the appearance of tube voltage at rectifier 148 acting through diode 167, adjustable resistor 168 and capacitor 169 establishes control of the voltage at base 158 to prevent firing of unijunction transistor 159. The applied control voltage is limited at some fixed level, say 20 volts, by the action of a breakdown diode 170 which is shunted by a capacitor 171. The maximum voltage at base 158 is limited to some level above the control voltage level, say 30 volts, by the action of a breakdown diode 172 which is connected through a diode 173 as shown. Thus, with the ignitrons at the retarded firing point, the unijunction transistor 159 is held off from firing by the control of the base voltage at base 158 through the application of tube voltage across capacitor 169.

As the firing of the ignitrons is advanced, the voltage peaks across the ignitrons decrease in magnitude and the voltage across the capacitor 169 establishing the voltage at base 158 is correspondingly reduced. At the preselected fully advanced firing point of the ignitrons, the voltage at capacitor 169 as established by the ignitron tube voltage falls below the firing level at base 158 and unijunction transistor 159 fires to discharge capacitor 164 through transformer 165 and its shunting resistor 174 to fire controlled rectifier 153.

The firing of controlled rectifier 153 connects the control voltage across resistor 175 to develop a defire signal at terminal 176. The firing of controlled rectifier 153 also connects control voltage through resistor 177 and diode 178 to the gate 179 of controlled rectifier 152. Firing of controlled rectifier 152 energizes relay coil A2 through closed contacts A1A and NB1 and diode 151 to close associated contactor A2A and move associated contactor A2B to the position illustrated by the dotted line.

It should be noted here that the firing of controlled rectifier 153 also energizes the gate 180 of controlled rectifier 181 through resistor 182 and diode 183. Controlled rectifier 181 cannot fire, however, because its control power source TL5 is not energized for the control mode presently under description.

As contactor A2B begins to move from the position shown in the solid line to the dotted line position, the control voltage connection to the anode of controlled rectifier 153 is momentarily interrupted and it therefore returns to its blocking state. This terminates current flow through resistor 175 and forms the trailing edge of the defire pulse appearing at terminal 176.

The energization of relay coil A2 also closes associated contactor A2 of the circuit of FIG. 1 to connect secondary winding section 29 into the motor power circuit. Contactor A2 is physically connected to contactor A2B such that when contactors A2 and A2B begin to move in response to the energization of coil A2, the trailing edge of the defire pulse at 176 is determined by the interruption of control voltage to the controlled rectifier 153. The end of the defire pulse is thus synchronized with the initiation of closing movement of the contactor A2 toward connecting winding 29 into the motor power circuit.

The action of the defire pulse to reset the ignitrons to a preselected retarded firing point synchronized with the closing movement of contactor A2 will now be described.

Terminal 176 of FIG. 7 is connected into the circuit of FIG. 3 as shown through a resistor 183 and a diode 184 to terminal 185 across a voltage dividing resistor 186 which is in turn connected to ground. The defiring operation is controlled by a transistor 187, the collector to emitter circuit of which is connected through an adjustable resistor 188 across the phase advance control capacitor 189.

When transistor 187 is turned "on" capacitor 115 discharges through resistor 188 with the final voltage across capacitor 115, and hence the phase retard point at which firing advance is next initiated, being determined by the length of time transistor 187 remains "on" in relationship to the discharge time constant of capacitor 115 through resistor 188. This time constant can be adjusted through adjustment of resistor 188 to achieve the desired final voltage across capacitor 115 for the preselected "on" time of transistor 187.

During normal tube firing, transistor 187 is held "off" by the back biasing action of a resistor 189 connected base to emitter as shown. Also capacitor 190 is charged to substantially the full D.-C. supply voltage, in this case plus 20 volts, diode 191 and resistor 186.

The appearance of the defire voltage pulse raises junction 185 to substantially the full 20-volt D.-C. level, with any excess being drained off through diode 192 to the regulated D.-C. supply line 79. Capacitor 190 is thus caused to discharge rapidly by pulse current through diode 193. This action does not, however, affect the "off" state of transistor 187. Nothing further happens as long as defire pulse voltage remains applied at junction 185. Resistors 183 and 186 are selected to permit rapid discharge of capacitor 190 in advance of the termination of the defire pulse.

When the defire pulse is terminated by the interrupting action of contactor A2B (FIG. 7), which occurs with movement of contactor A2 (FIG. 1) toward its closed position, capacitor 190 begins to recharge, drawing current through diode 191 and the base of transistor 187. This turns transistor 187 "on" and begins the discharge of capacitor 115 as previously explained.

The "on" time of transistor 187 is determined by the charging time of capacitor 190 through resistor 186, and this time constant is selected in relationship to the discharge time constant of capacitor 115 through resistor 188 so that capacitor 115 is discharged to a selected retarded firing point control level preparatory to rescheduling the controlled firing advance of the ignitrons.

By synchronizing the defiring action with the trailing edge of the firing pulse which is, in turn, determined by commencement of movement of contactor A2 (FIG. 1), the stepping back of the voltage applied to the motor power circuit by winding 27 is exactly synchronized with the application of the voltage of winding 29 through the closing of contactor A2. Thus, undesirable surges at the point of switchover are avoided.

Now winding 29 has been connected into the power circuit and the appearance of tube voltage at rectifier 148 (FIG. 7) as connected through filter 149 and terminal 150 to terminal 111 (FIG. 3) initiates controlled phase advance of ignitron firing in the manner already described. When the fully advanced firing point of the ignitrons is reached, further firing of unijunction transistor 159 (FIG. 7) cannot take place because contactor A2B is in its dotted line position and train line TL5 to which it is connected through A2A is not energized. This then terminates the motor voltage increase sequence for controller notch 3.

With the operator's controller in notch 4, train lines TL2, TL3, TL4 and TL5 are energized. The system goes through the same sequence here as described above in connection with notch 3 operation except that when the fully advanced firing point is reached at the conclusion of the above sequence, unijunction transistor 159 is again fired because control power is now available from TL5.

Controlled rectifier 153 is therefore again fired in the same manner as described above to initiate the defiring pulse and to energize the gates of controlled rectifiers 152 and 181. Controlled rectifier 152 is already "on" but controlled rectifier 181 is "off" because controlled rectifier 153 has previously been turned "off" by the interrupting action of contactor A2B, which is physically tied to A2A, and which therefore shuts off rectifier 153 instantaneously with movement of A2B and A2A and prior to the time A2A reaches its closed condition.

Controlled rectifier 181 is now fired to energize relay coil A3. This actuates contactors A3 (FIG. 1), A3A and A3B, all of which are physically tied together in the same manner as contactors A2, A2A and A2B. At the point of movement of contactor A3 (FIG. 1) toward its closed position to connect secondary winding 28 into the motor power circuit, contactor A3B opens to interrupt control voltage to controlled rectifier 153 and thereby terminate the defire pulse. This defires the ignitrons in the manner already described above and phase advance is then again initiated as winding 28 is connected into the motor power circuit. When the fully advanced ignitron firing point is again reached, unijunction transistor 159 cannot again fire because contact A3B is open and control voltage is not available. This then terminates the sequence for the notch 4 controller position with the full available voltage applied to the motor power circuit.

Under some operating conditions, such as, for example, operation on a steep grade or the appearance of an A.-C. line voltage surge, the modulation of ignitron firing point in response to the load current limiting control of FIG. 3 may not provide the range necessary for excessive load currents. Under these conditions, it may be necessary to disconnect windings 28 or 29 from the motor power circuit.

This is accomplished automatically through the operation of a notch back relay having a coil NB and contactors NB1 and NB2 connected as shown in FIG. 7. Operation of the notch back relay is controlled by a load current signal connected through a voltage divider formed of adjustable resistor 194 and resistor 195 to a resistor 196 and a capacitor 197 so as to control the emitter voltage of a unijunction transistor 198.

The upper base of unijunction transistor 198 is supplied from a regulated source connected through a resistor 199 to establish a preselected emitter trigger voltage. When the load current exceeds a preselected level, say 10% in excess of the regulated level, the unijunction transistor is caused to fire by reason of the increase in voltage across capacitor 197 into the firing range. The point of firing of unijunction transistor 198 in relation to load current magnitude can be adjusted through adjustment of resistor 194. Unijunction transistor 198 fires through a resistor 200 to develop a firing voltage at the gate of controlled rectifier 201, which fires and energizes coil NB of the notch back relay. This opens contactors NB1 and NB2.

If both of the relay coils A2 and A3 are energized with all power transformer secondary windings thus being connected into the motor power circuit, contactor A3A will be in its dotted line position. The opening of NB1 will thus produce no effect because it is shunted by contactor A3A in its dotted line position. The opening of NB2, however, returns controlled rectifier 181 to its blocking state and de-energizes relay coil A3 to open contactor A3 (FIG. 1) and disconnect winding 28 from the motor power circuit.

If relay coil A3 is not energized when notch back relay coil NB is activated, contactor A3A will be in its solid line position and the opening of contact NB will thus de-energize coil A2 and open contactor A2 to disconnect winding 29 from the motor power circuit. Thus, sequential notch back is assured.

In either case, when NB1 opens the power to notch back relay coil NB is interrupted and contacts NB1 and NB2 reclose after a short time delay provided by the holding action of a diode 202.

Unijunction transistor 198 is prevented from immediate refiring by a relatively long recharging time constant, say one quarter second, of a capacitor 197 through resistor 196 to allow time for the resulting downward adjustment of load current.

Similar means to prevent immediate refiring are provided for unijunction transistor 159. The defire voltage at resistor 175 is connected back through a diode 203 to a capacitor 204 which through a diode 205 and resistor 206 establishes a momentary holding voltage at base 158 to prevent refiring if tube voltage at rectifier 148 is momentarily non-existent.

It will be seen from the foregoing that I have provided an improved control system for regulating and controlling D.-C. load voltage from an A.-C. power source by means of switching voltage blocks into and out of the power circuit and synchronizing the phase advance and retarding controls of a phase controlled firing system with the switching operations. It will be observed also that the system presented herein contains a number of improved features particularly applicable to electric railway propulsion applications, all of which are described above in relationship to the particular embodiment presented.

Smooth adjustment of applied D.-C. voltage is obtained over the full range of available voltage with control over only a portion of the supply. Any number of voltage blocks can be employed depending on the needs of the particular application at hand. In this connection, it should be noted that the voltage of winding 27 should be somewhat higher than the voltages of windings 28 and 29 because the full voltage of winding 27 is not available at diode bridge 30 and it is desirable from the standpoint of smoothness of control that the fixed voltage increments switched into the power circuit be of substantially the same magnitude as the maximum controlled voltage of the regulated block.

It is to be understood, of course, that the embodiment of my invention set forth herein is described in detail in order to present a full and clear description and that my invention is not limited to the details of the particular embodiment presented. Accordingly, various changes, modifications and substitutions may be made in the embodiment described herein without departing from the true scope and spirit of my invention as defined in the appended claims.

What I claim as new and desire to secure by Letters Patent of the United States is:

1. A control system for regulating the D.-C. voltage applied to D.-C. motor system from an A.-C. source comprising:
   (a) means connectable to such A.-C. source for establishing a plurality of D.-C. voltage blocks representing increments of D.-C. voltage to be applied to the power circuit of said motor system,
   (b) at least one of said blocks being an adjustable voltage block including phase controlled impedance means for regulating the output D.-C. voltage magnitude of said block over a preselected range in response to adjustment of such phase controlled impedance means,
   (c) means for sequentially switching said D.-C. voltage blocks into and out of the power circuit of said D.-C. motors to control the D.-C. voltage applied to said motor system, and
   (d) means responsive to said switching action for automatically adjusting said adjustable voltage block back to a preselected reduced voltage level to permit modulation of said adjustable voltage block to be initiated at said reduced voltage level upon the switching of an additional voltage block into the power circuit of said motor system.

2. A motor control system for regulating the D.-C. voltage applied to a D.-C. motor system from an A.-C. source comprising:
   (a) means connectable to said A.-C. source for establishing a plurality of D.-C. voltage blocks representing increments of D.-C. voltage to be applied to the power circuit of said motor system,
   (b) at least one of said blocks including phase controlled impedance means for regulating the output D.-C. voltage magnitude of said block over a preselected range in response to adjustment of said phase controlled impedance means,
   (c) means for sequentially switching said D.-C. voltage blocks into and out of the power circuit of said D.-C. motor system to control the D.-C. voltage applied to said motor system,
   (d) means responsive to said switching action for automatically adjusting said adjustable voltage block back to a preselected voltage level to permit modulation of said adjustable voltage block to be initiated at said reduced level upon the switching of an additional voltage block into the power circuit of said motor system, and
   (e) means for regulating the D.-C. output voltage magnitude of said adjustable voltage block in response to motor load current to limit the maximum load current in said motor system to a preselected magnitude.

3. A motor control system for regulating the D.-C. voltage applied to a D.-C. motor system from an A.-C. source comprising:
   (a) means connectable to said A.-C. source for establishing a plurality of D.-C. voltage blocks representing increments of D.-C. voltage to be applied to the power circuit of said motor system,
   (b) at least one of said blocks including phase controlled impedance means for regulating the output D.-C. voltage magnitude of said block over a preselected range in response to adjustment of said phase controlled impedance means,
   (c) means for sequentially switching said D.-C. voltage blocks into and out of the power circuit of said D.-C. motor system to control the D.-C. voltage applied to said motor system,
   (d) means responsive to said switching action for automatically adjusting said adjustable voltage block back to a preselected voltage level to permit modulation of said adjustable voltage block to be initiated at said reduced level upon the switching of an additional voltage block into the power circuit of said motor system, and
   (e) means for modulating the D.-C. output voltage magnitude of said adjustable voltage block in response to the time rate of change of load current in said motor system.

4. A motor control system for regulating the D.-C. voltage applied to a D.-C. motor system for an A.-C. source comprising:
   (a) means connectable to said A.-C. source for establishing a plurality of D.-C. voltage blocks representing increments of D.-C. voltage to be applied to the power circuit of said motor system,
   (b) at least one of said blocks including phase controlled impedance means for regulating the output D.-C. voltage magnitude of said block over a preselected range in response to adjustment of said phase controlled impedance means, (c) means for sequentially switching said D.-C. voltage blocks into and out of the power circuit of said D.-C. motor system to control the D.-C. voltage applied to such motor system, (d) means responsive to said switching action for automatically adjusting said adjustable voltage block back to a prselected voltage level to permit modulation of said adjustable voltage block to be initiated at said reduced level upon the switching of an additional voltage block into the power circuit of said motor system, (e) first means for modulating the D.-C. output voltage magnitude of said adjustable voltage block to limit the maximum load current in said motor system to a preselected magnitude, and (f) second means for modulating the D.-C. output voltage magnitude of said adjustable voltage block in response to the time rate of change of load current in said motor system.

5. A motor control system as set forth in claim 4 in which said means for modulating the D.-C. output voltage magnitude of said adjustable voltage block in response to the time rate of change of load current includes first means responsive to slow time rates of change of load current and second means responsive to fast time rates of change of load current.

6. A motor control system as set forth in claim 5 in which the corrective signal generated by said second time rate responsive means is limited to a preselected maximum signal magnitude range.

7. A motor control system for regulating the D.-C. voltage applied to a D.-C. motor system from an A.-C. source comprising:

(a) means connectable to said A.-C. source for establishing a plurality of D.-C. voltage blocks representing increments of D.-C. voltage to be applied to the power circuit of said motor system, (b) at least one of said blocks including phase controlled impedance means for regulating the D.-C. output voltage magnitude of said block over a preselected range in response to adjustment of said phase controlled impedance means, (c) means for sequentially switching said D.-C. voltage blocks into and out of the power circuit of said D.-C. motor system to control the D.-C. voltage applied to said motor system, (d) firing control means for said phase controlled impedance means for controlling the D.-C. output voltage of said adjustable voltage block, and (e) means for synchronizing the firing controlling action of said firing control means with the trailing edges of the voltage half waves applied across said phase controlled impedance means.

8. A motor control system for regulating the D.-C. voltage applied to a D.-C. motor system from an A.-C. source comprising:

(a) rectifier means connectable to said A.-C. source through a plurality of transformer winding sections to establish a plurality of corresponding D.-C. voltage blocks representing increments of D.-C. voltage to be applied to the power circuit of said motor system, (b) at least one of said blocks including phase controlled impedance means for regulating the D.-C. output voltage magnitude of said block over a preselected range in response to adjustment of said phase controlled impedance means, (c) contactor means associated with each of said voltage blocks for sequentially connecting said voltage blocks into and out of the power circuit of said motor system to regulate the magnitude of the D.-C. voltage applied to said motor system, (d) defiring means for retarding the firing of said phase controlled impedance means to reduce the D.-C. output voltage of said adjustable voltage block to a preselected level, and (e) means for actuating said defiring means in response to movement of said contactor means toward switching an additional voltage block into the power circuit of said motor system.

9. A motor control system for regulating the D.-C. voltage applied to a D.-C. motor system from an A.-C. source comprising:

(a) rectifier means connectable to said A.-C. source for establishing a plurality of D.-C. voltage blocks representing increments of D.-C. voltage to be applied to the power circuit of said motor system, (b) at least one of said blocks including phase controlled impedance means for regulating the D.-C. output voltage magnitude of said block over a preselected range in response to adjustment of the firing point of said phase controlled impedance means, (c) means for sequentially switching said D.-C. voltage blocks into and out of the power circuit of said motor system to control the D.-C. voltage applied to said motor system, (d) means for synchronizing the firing control action of said phase controlled impedance means with said sequential switching action to provide smooth adjustment of said D.-C. voltage over the full available range represented by the sum of said voltage blocks, and (e) means for scheduling a maximum time rate of advance of the firing of said phase controlled impedance means to establish a maximum time rate of increase of the D.-C. output voltage magnitude of said adjustable voltage block.

10. A control system as set forth in claim 9 including means for further controlling the firing of said phase controlled impedance means in response to motor load current magnitude to limit the motor load current to a preselected maximum level.

11. A control system as set forth in claim 10 including means for controlling the firing of said phase controlled impedance means in response to the time rate of change of said motor load current.

12. A control system as set forth in claim 11 in which said time rate of change responsive means includes first means responsive to fast time rates of change of motor load current and second means responsive to slow rates of change of motor load current.

References Cited by the Examiner

UNITED STATES PATENTS 2,611,117  9/1952  Hibbard ___________ 318—414
3,128,422  4/1964  Brown.

FOREIGN PATENTS 114,781  3/1942  Australia.

ORIS L. RADER, *Primary Examiner.*

MILTON O. HIRSHFIELD, *Examiner.*

J. C. BERENZWEIG, S. GORDON,
*Assistant Examiners.*